(12) United States Patent
Ha et al.

(10) Patent No.: US 11,115,219 B2
(45) Date of Patent: Sep. 7, 2021

(54) METHOD AND SYSTEM FOR PREVENTING DISTRIBUTION OF ILLEGAL CONTENT OVER THE INTERNET

(71) Applicant: Sang Min Ha, Iksan-si (KR)

(72) Inventors: Sang Min Ha, Iksan-si (KR); Sang Seob Lee, Seoul (KR)

(73) Assignee: Sang Min Ha

( * ) Notice: Subject to any disclaimer, the term of this patent is extended or adjusted under 35 U.S.C. 154(b) by 214 days.

(21) Appl. No.: 16/394,954

(22) Filed: Apr. 25, 2019

(65) Prior Publication Data
US 2020/0313895 A1 Oct. 1, 2020

(30) Foreign Application Priority Data

Mar. 26, 2019 (KR) .................. 10-2019-0034216
Apr. 11, 2019 (KR) .................. 10-2019-0042739

(51) Int. Cl.
*H04L 9/32* (2006.01)
*G06F 16/951* (2019.01)
*G06F 16/14* (2019.01)

(52) U.S. Cl.
CPC .......... *H04L 9/3236* (2013.01); *G06F 16/152* (2019.01); *G06F 16/951* (2019.01); *H04L 9/3247* (2013.01); *H04L 2209/60* (2013.01)

(58) Field of Classification Search
CPC . H04L 9/3236; H04L 9/3247; H04L 2209/60; H04L 9/0643; H04L 9/0894; H04L 63/306; H04L 67/104; G06F 16/951; G06F 16/152; G06F 16/958; G06F 21/10; G06F 16/137; G06F 16/148
See application file for complete search history.

(56) References Cited

U.S. PATENT DOCUMENTS

| | | | |
|---|---|---|---|
| 2009/0319502 A1* | 12/2009 | Chalouhi | H04L 67/1046 |
| 2010/0211608 A1* | 8/2010 | Dolganow | G06F 16/1837 |
| | | | 707/803 |
| 2012/0291135 A1* | 11/2012 | Peled | G06F 21/10 |
| | | | 726/26 |
| 2014/0025728 A1* | 1/2014 | Chopra | H04L 67/108 |
| | | | 709/203 |
| 2014/0289862 A1* | 9/2014 | Gorfein | G06F 21/16 |
| | | | 726/26 |

* cited by examiner

*Primary Examiner* — Christopher C Harris
(74) *Attorney, Agent, or Firm* — Innovation Counsel LLLP

(57) ABSTRACT

Provided is a method of preventing illegal content from being distributed over the Internet, the method including searching for, by a distribution prevention module, file information corresponding to specific content through a tracker, extracting, by the distribution prevention module, a target peer that distributes the specific content on the basis of the file information to generate an identification value of the target peer, establishing, by the distribution prevention module, an initial connection with the target peer, and transmitting, by the distribution prevention module, a mutation message to the target peer.

15 Claims, 4 Drawing Sheets

METHOD AND SYSTEM FOR PREVENTING DISTRIBUTION OF ILLEGAL CONTENT OVER THE INTERNET

CROSS-REFERENCE TO RELATED APPLICATION

This application claims priority to and the benefit of Korean Patent Application Nos. 10-2019-0034216, filed on Mar. 26, 2019 and 10-2019-0042739, filed on Apr. 11, 2019, the disclosure of which is incorporated herein by reference in its entirety.

BACKGROUND

1. Field of the Invention

The present disclosure relates to a method and system for preventing illegal content from being distributed over the Internet, and more specifically, to a method and system for isolating a user computer that executes illegal sharing or distribution of a data file or content using a peer-to-peer (P2P) communication method over the Internet by detecting the sharing or distribution.

2. Discussion of Related Art

Generally, various types of data or content files are freely shared or distributed among a plurality of users using a peer-to-peer (P2P) communication method over the Internet. One of the most widely used data or content sharing programs is Torrent (Torrent, BitTorrent, uTorrent, and the like), a program that divides a file stored in a plurality of user computers connected to the Internet into several pieces and allows the pieces to be directly shared or distributed between the users by the P2P communication method. Torrent, unlike the existing P2P service, uses a one-to-many sharing method in which a whole file (for example, a data file, a content file, or a software program) is not received from a single computer all at once but information of divided file pieces of the file are received from a plurality of user computers. Accordingly, the more user computers use Torrent, the faster a specific file is downloaded.

A user who uses a torrent program may take on the role of either a sender or a receiver of a specific file, and the role of the sender/receiver of the file is changed in real time. That is, a user, who is sharing a file stored in his or her computer with another user, executes a role of a server as a sender (an uploader), but the user, downloading a file from a computer of another user, executes a role of a client as a receiver (a downloader). Meanwhile, once a file stored in a user computer is shared with another user to some extent, the user computer takes on both roles of the server and the client, thereby uploading or downloading pieces of the file. For example, upon installing a torrent program on a user computer, such as a personal computer (PC) and the like, and executing a seed file of a file desired to be downloaded, the user computer may download the file from user computers having pieces of the file over the Internet. In another example, a desired file may be downloaded by inputting a code address of a specific file using a magnet address provided by a torrent program.

Such a Torrent using a P2P communication method is beneficial in transfer of large files and thus is widely used for efficient transfer of a file bundle between users. In addition, Torrent is also used for downloading large content files, such as a movie or TV content, however, in such a case file sharing may occur illegally without permission of a content owner or a copyright owner.

The program for distributing or sharing a data file using a P2P communication method, such as Torrent, is produced to obtain a desired file at a high speed over the Internet, but with no need to execute a separate authentication or payment procedure regarding a user or access to a data file, becomes a path that allows anyone to easily distribute or share illegal contents, such as pornography and pirated images over the Internet. In addition, when a server that operates Torrent is installed overseas, it is difficult to track a distribution path of the file. In particular, Torrent accesses and downloads a desired file through a link (a seed file or a magnet address) of a specific file, and therefore it is difficult to detect and punish distribution of illegal content.

SUMMARY OF THE INVENTION

The present invention is directed to providing a method and system capable of detecting illegal sharing and distribution of a data file or content using a peer-to-peer (P2P) communication method over the Internet and isolating a user computer that executes the sharing and distribution in order to make up for the above described shortcoming of illegal content distribution through the conventional Torrent The technical objectives of the present invention are not limited to the above, and other objectives may become apparent to those of ordinary skill in the art based on the following descriptions.

According to an aspect of the present invention, there is provided a method of preventing illegal content from being distributed over the Internet, the method including: searching for, by a distribution prevention module, file information of specific content; extracting, by the distribution prevention module, a target peer that distributes the specific content on the basis of the file information to generate an identification value of the target peer; establishing, by the distribution prevention module, an initial connection with the target peer; and transmitting, by the distribution prevention module, a mutation message to the target peer.

According to an aspect of the present invention, there is provided a system for preventing illegal content from being distributed over the Internet, the system including: a tracker configured to store and manage information about target peers that download or upload specific content and a distribution prevention module configured to search for file information corresponding to the specific content and prevent the specific content from being distributed by the target peers on the basis of the file information. The distribution prevention module extracts a target peer that distributes the specific content on the basis of the file information to generate an identification value of the target peer, establishes an initial connection with the target peer, and transmits a mutation message to the target peer to increase the number of queues of a job queue of the target peer so that distribution of the specific content is prevented.

DETAILED DESCRIPTION OF EXEMPLARY EMBODIMENTS

Figure 1:
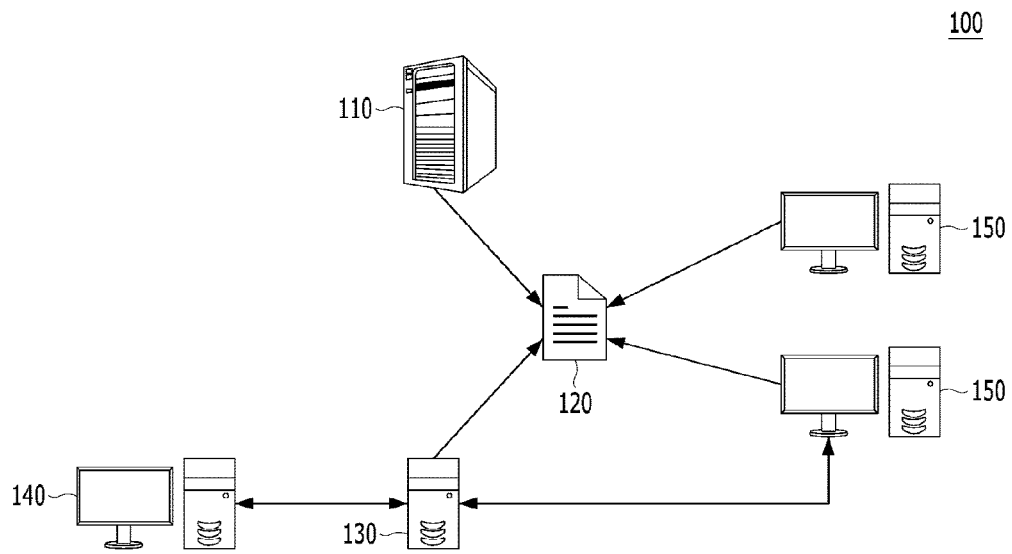
FIG. 1 is a diagram illustrating a configuration of a torrent system according to an embodiment of the present disclosure.

Hereinafter, embodiments of the present disclosure will be described in detail with reference to the accompanying drawings. In the description of the embodiments, the detailed description of related known functions or constructions will be omitted herein to avoid making the subject matter of the present disclosure unclear.

In the accompanying drawings, parts that are identical or equivalent to each other will be assigned the same reference numerals, and in the following description of the embodiments, details of redundant descriptions thereof will be omitted. However, such an omission of some parts does not intend to exclude the parts in a certain embodiment.

In the present disclosure, a "peer" may refer to any user or a computer of the user accessing specific content (or a specific file). The peer may be divided into a seeder (or a complete downloader) and a leecher. The seeder may represent a user or a computer of the user that stores a 100% completed content file, and the leecher may represent a user or a computer of the user that stores an incomplete content file that is not 100% completed. That is, all users who are using a torrent file may serve as the peers, but the seeder may be a user having the entirety of a content file constituting the torrent among the users and when at least one seeder exists, the entirety of the content file constituting the torrent may be received independent of the data transmission speed. On the other hand, the leecher may include a user who stores part of a content file constituting the torrent, or a user who is downloading part of the content file. In particular, when a content file is downloaded, whether access to the file is performable is determined according to a queue of a job queue of a user storing the file. That is, even when a query is transmitted to a user computer that has a sufficiently high communication speed or great bandwidth, if a job queue of the user computer is already full, the query may not be added to the job queue of the user, thereby causing difficulty in accessing content stored in the user computer.

In the present disclosure, a "seed" is a file that serves as a starting point for distribution of specific content in a torrent system, and when seed files possessed by a large number of users are simultaneously distributed and collected, a single content file is constituted. The complete content file may be divided again and registered as new seed files on the torrent system so that the new seed files are prepared for being downloaded again by other users. In a torrent system having the above described configuration, content files may be downloaded and uploaded at an increased speed FIG. 1 is a diagram illustrating a configuration of a torrent system according to an embodiment of the present disclosure. Referring to FIG. 1, a torrent system 100 includes a web server 110 for providing a torrent file 120, a tracker 130, a seeder 140, and downloaders 150. The web server 110 may be a computer in which a torrent service program for transmitting content requested by a user (e.g., a document, an image, or a video file) via a web browser through Hyper Text Transfer Protocol (HTTP) is executed. In an embodiment, the web server 110 may be a site in which the torrent file 120, which is a meta information file regarding content, and a content file that is linked by the torrent file 120 and is actually to be serviced are stored.

The torrent file 120 may be a meta information file (e.g., a file represented by a ".torrent" extension) regarding a content file that is to be actually serviced. In the configuration of the torrent system 100, the torrent file 120 may be provided via a link that is displayed on a web page serviced by the web server 110. For example, a module for generating a torrent file in the web server 110 may be implemented in the Python programming language. Parameters used when the web server 110 generates the torrent file 120 may include an absolute path of an address in which the actual content file is stored and an address of the tracker 130 (e.g., uniform resource locator: URL).

The tracker 130, as a peer-to-peer (P2P) mediation server, executes mediation of data transmission between peers or collects various types of statistical data related to data transmission. In one example, when a peer downloads the torrent file 120 from the web server 110, the torrent file 120 may basically include the address of the tracker 130 connected to the torrent file 120. In another example, when the number of seeders 140 of the torrent file 120 is insufficient, or when a private torrent service is used, an additional tracker address may be added to the torrent file 120 in addition to the address of the tracker 130.

Among the peers, the leecher (or a downloader) 150 may request download of a content file to be actually serviced by using the torrent file 120 linked to the web page provided by the web server 110. The downloader 150 may download the file through communication with the tracker 130 using the address included in the torrent file 120, and the tracker 130 may receive the file through communication with the seeder 140. When the downloader 150 requests download of the content file using the torrent file 120, the address of the tracker 130 (e.g., an HTTP URL) and the absolute path of the actual content may be input using parameters. When initiating download of a content file, the downloader 150 may reshare the downloaded file to maintain a seed of the file. That is, the downloader 150 may download content while starting to share the content file so that another user computer (or another downloader) may more efficiently download the file.

Figure 2:
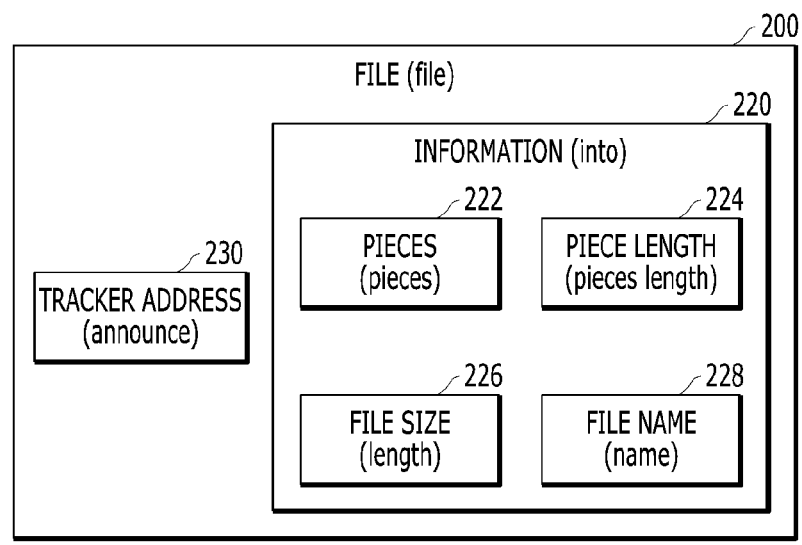
FIG. 2 is a diagram illustrating information (info) recorded in a torrent file.

FIG. 2 is a diagram illustrating information (info) recorded in a torrent file. A torrent file 200 may include file information (info) 220 and announce 230. The file information 220 may include file pieces (pieces) 222, a length of file pieces (piece length) 224, a size of a file (length) 226, and a filename (name) 228, of a content file. The file pieces 222 may represent a string representing a concatenation of hash values (hash keys) of pieces of the corresponding file. Meanwhile, the announce 230 may include an address of a tracker (e.g., a URL).

In an embodiment, referring to FIG. 1, peers in the torrent system 100, such as the downloaders 150, transmit respective queries including information thereof to the tracker 130 using a HTTP protocol. The tracker 130 may store and manage the information about the peers received in the form of queries. For example, peer information managed by the tracker 130 may include peer ID including a port value of the peer, an Internet Protocol (IP) address of the peer, an amount uploaded by the peer, an amount downloaded by the peer, an amount remaining after upload/download, an event type, and the like, and a unique hash value (e.g., infohash) of a content file associated with the peer ID.

Figure 3:
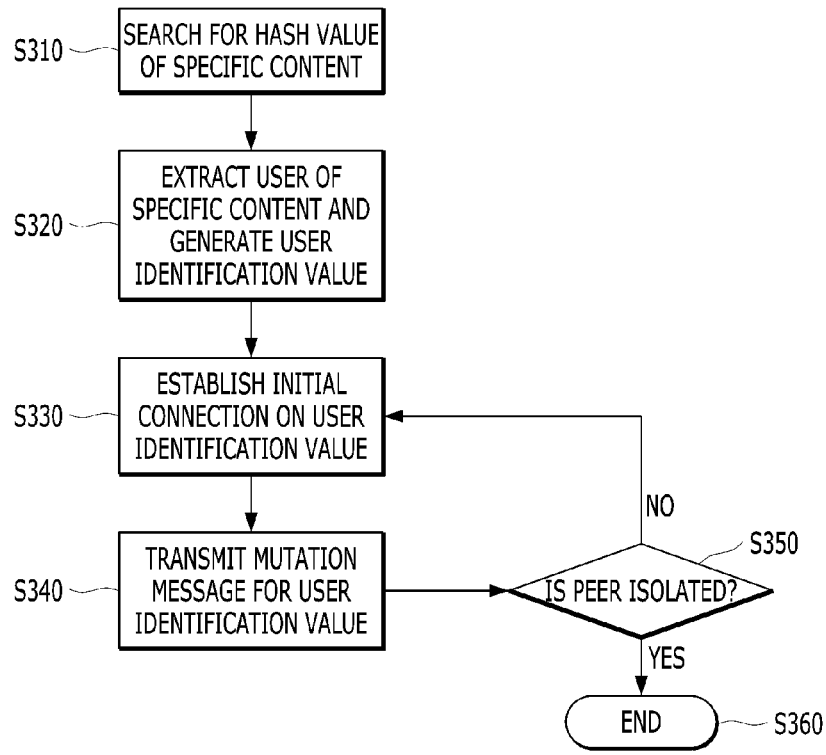
FIG. 3 is a flowchart showing a method of preventing illegal content from being distributed over the Internet according to an embodiment of the present disclosure.

FIG. 3 is a flowchart showing a method of preventing illegal content from being distributed over the Internet according to an embodiment of the present disclosure. A method 300 of preventing illegal content from being distributed over the Internet may be initiated by searching for a hash value of specific content (S310). Referring to FIG. 2, the hash value of the content may be a value obtained by performing a secure hash algorithm (SHA) hash on the pieces 222 of the torrent file. In an embodiment, the searching for the hash value of the specific content identifies an uploader associated with the content (for example, an uploader associated with illegal content) or a downloader associated with the content.

When the hash value of the specific content (or illegal content) is found in operation S310, all users corresponding to the hash value are extracted, and identification values corresponding to the users may be generated (S320). In detail, user identification values of specific content may be generated from peer IDs (information including a dataset including a port and IP value of a peer) corresponding to the user. For example, as will be described below with reference to FIG. 4, a distribution prevention module 410 transmits a hash value of specific content file to the tracker 130, and the tracker 130 may provide a list of identification values of users corresponding to the hash value (e.g., peer IDs and the like).

Then, an initial connection for each of the user identification values is established (S330). In detail, the establishing of the initial connection may be executed by a handshake procedure. In the handshake procedure, as will be described below with reference to FIG. 4, communication channel signals between the distribution prevention module 410 and target peers 430 corresponding to the user identification values are checked, and communication channels for exchanging a content file are established.

In addition, a mutation message is transmitted to each of the user identification values (S340). In an embodiment, the transmitting of the mutation message to the respective user identification values (e.g., peer IDs) of the illegal content allows a logical defect to occur in a torrent client program used by the users. For example, a query may be repeatedly transmitted to a job queue (a queue) corresponding to a user identification value of illegal content such that the number of jobs waiting is increased. In this case, users transmitting more queries than a predetermined number of jobs waiting in the job queue corresponding to the user identification value may be prevented from being accessed for the illegal content.

After having caused a logical defect in the torrent client program used by the illegal content users by transmitting the mutation message to each of identification values of the illegal content users as such, it is determined whether the computer (that is, the peer) is in an isolated state so that the illegal content stored in the computer is not accessible (S350). When it is determined that the peer is not isolated yet and illegal contents are continuously being downloaded or uploaded to be distributed, the initial connection operation S330 and/or the mutation message transmission operation S340 may be repeatedly performed. On the other hand, when it is determined that the peer is isolated and illegal content is not being downloaded or uploaded any more, the procedure of isolating the user of the illegal content is terminated (S360).

Figure 4:
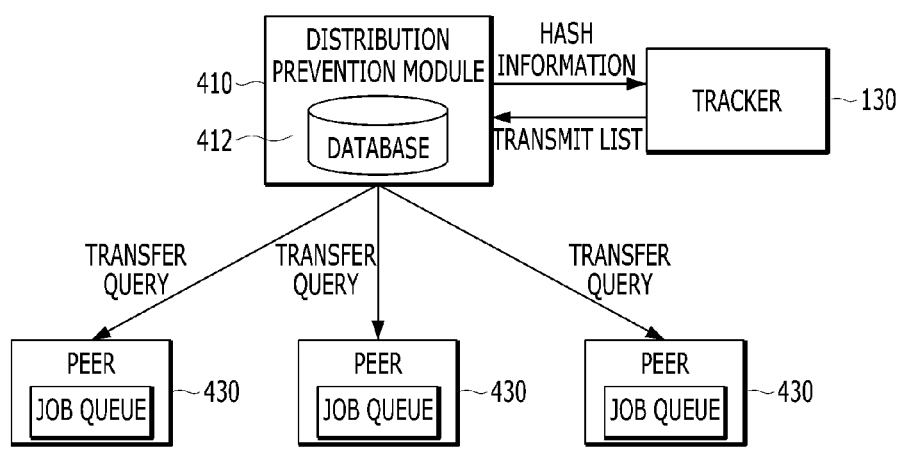
FIG. 4 is a diagram illustrating an operation of a distribution prevention module that executes a method of preventing illegal content from being distributed over the Internet according to an embodiment of the present disclosure.

FIG. 4 is a diagram illustrating an operation of the distribution prevention module that executes a method of preventing illegal content from being distributed over the Internet according to an embodiment of the present disclosure. Referring to FIG. 4, a distribution prevention module 410 may include a database 412 for storing information regarding illegal content.

The distribution prevention module 410 may transmit a hash value of an illegal content file to the tracker 130 and may receive a list of user identification values (user identification users) associated with the illegal content from the tracker 130. In an embodiment, the tracker 130 extracts all user identification values (for example, peer IDs, and the like) corresponding to the hash value of the illegal content file, generates identification values (e.g., data sets each including a peer port value, a peer IP address, and the like), converts the identification values into a list, and transmits the list to the distribution prevention module 410. The list of identification values may be received by the distribution prevention module 410 and stored in the database 412.

The database 412 may include a meta file having basic information about a torrent file of illegal content and Torrent. That is, the database 412 may include a name of a torrent file of illegal content, a unique hash value of a content file, an address of a tracker, metadata of the content file, a name of the content file, and the like. Generation of the information about the torrent file may be executed by connecting hash keys of file pieces into a single string. Here, the hash key may refer to information (info) including pieces (a hash key concatenated string), a file piece length, a file size, and a pure file name.

The distribution prevention module 410 may specify peers having the user identification values as target peers 430 using the list of user identification values received from the tracker 130. The distribution prevention module 410 may isolate the peers by transmitting a query (or a mutation message) to the target peers 430 set as the above. For example, the distribution prevention module 410 establishes a new communication connection with the target peers 430 through a handshake and then transmits a mutation message to the target peers 430 to cause a logical defect in the torrent client program such that the target peers 430 are isolated. Although the distribution prevention module 410 according to the embodiment specifies the target peer 430 on the basis of the list of user identification values received from the tracker 130, the present disclosure is not limited thereto, and the distribution prevention module 410 may look up the target peers in distributed hash tables (DHTs) or a web server.

In an embodiment, the distribution prevention module 410 may artificially increase the number of jobs waiting in the job queues of the peers 430 by transmitting queries to the target peers 430. In this case, the job queues of the peers do not process the queries in a parallel manner to concurrently distribute contents requested by the queries but instead, process the queries in a serial manner to distribute the requested contents. In such a serialized job queue, queues for queries are generated so that the amount of traffic with respect to the peers may be rapidly increased. Meanwhile, the distribution prevention module 410 may include a device for measuring queues or traffic amount of a job queue of each of the target peers 430 so that an access to peers (seeds)

having a predetermined number and amount of queues and traffic or more in the job queue is prevented.

In addition, while downloading illegal content, a peer may serve as not only a downloader but also an uploader as a leecher or seeder. Accordingly, the distribution prevention module 410 may also transmit a mutation message to another peer which is downloading the illegal content from the target peer 430 to isolate the other peer so that additional distribution of the illegal content is prevented.

Figure 5:
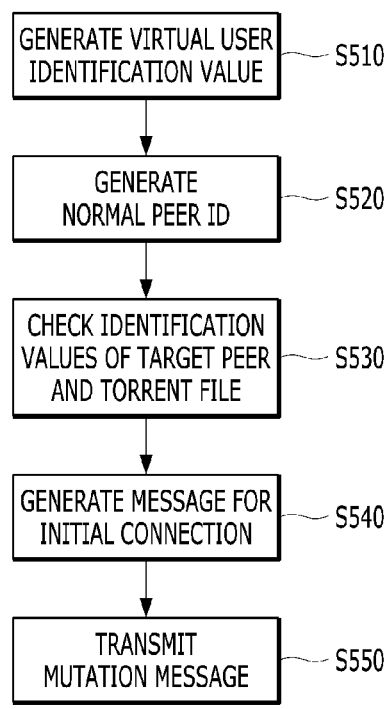
FIG. 5 is a flowchart showing a method of isolating a peer that distributes illegal content over the Internet according to an embodiment of the present disclosure.

FIG. 5 is a flowchart showing a method of isolating a peer that distributes illegal content over the Internet according to the embodiment of the present disclosure. A method 500 of isolating a peer that distributes illegal content over the Internet may be initiated by generating a virtual user identification value (S510).

The generation of the virtual user identification value (S510) may include generating a virtual peer and a virtual peer ID. For example, the virtual peer ID may include a null character of 12 bytes and a SHA hash value of 8 bytes, forming 20 bytes altogether. The virtual peer ID may indicate an identification value of a peer corresponding thereto and a version identification value of a client program used by the peer. In operation S510, the virtual peer ID is generated, and the virtual peer ID is used to transmit a query to a user who distributes illegal content file to prepare to increase the number of queues in a job queue of the user.

Then, a normal peer ID is generated using the virtual user identification value (S520). The normal peer ID may be generated using the virtual user identification generated in operation S510 and may represent a normal peer ID generated as a virtual hash value such that a client is identified.

In operation S530, identification values of a target peer (or a computer) and a torrent file are checked. According to an embodiment, a client program version of a target peer that is distributing or downloading a torrent file may be identified, and an IP address and a port value of the target peer may be derived. Here, a 20-byte peer ID transmitted by a handshake may identify the client implementation and version. In an embodiment, the distribution prevention module 410 may receive a peer list that is generated by extracting peer IDs corresponding to a content hash value of a torrent file through the tracker 130 and specify target peers that distribute illegal contents.

In operation S540, a message for an initial connection with the target peer is generated. According to an embodiment, a handshake process for establishing a communication channel between the distribution prevention module 410 having received the peer list through the tracker 130 and the peers 430 may be performed. In one example, a peer generated by the distribution prevention module 410 and the target peer 430 may start communication using the BitTorrent protocol and, in the communication process, periodically exchange a content hash value and peer ID information thereof. For example, the peer protocol may operate on the TCP protocol or the uTorrent transport protocol (uTP), and the peer protocol may look up file pieces by an index indicated in the torrent file. Here, the index may include the tracker address and information (info) of the torrent file (or meta information file) shown in FIG. 2.

In an embodiment, a handshake message between the distribution prevention module 410 and the peers 430 begins with a character 19 (decimal) and subsequently includes a string of BitTorrent protocol. The fixed-length header is followed by pre-specified data of 8 bytes, and according to the current implementation of BitTorrent, the 8-byte data may be set to all zeros. In addition, the handshake may also have a SHA hash value of 20 bytes and a peer ID of 20 bytes behind the 8-byte prespecified data.

The peer ID is a value that is reported when the distribution prevention module 410 makes a request of the tracker 130 and is a value included in a peer list sent by the tracker 130 in response to the request. When a receiving side peer ID does not match a value expected by an initiating side peer, the initiating side peer may drop the connection. Once the handshake is completed, a predetermined length of data and message may be transmitted.

After the initial connection is established through the execution of the handshake with respect to the target peer as described above, a mutation message is transmitted to the target peer (S550). In an embodiment, the transmitting of the mutation message to the target peer 430 from the distribution prevention module 410 allows a peer distributing a specific illegal content file to be isolated. The distribution prevention module 410 may cause a logical defect in an algorithm in a torrent client program executed by the target peer 430 through a self-developed function so as to restrict download and upload of illegal contents. In this case, in order to isolate the target peer, the distribution prevention module 410 continuously and repeatedly generates an identification value of a virtual user and transmits a query generated from the virtual user to a job queue of the target peer to increase the number of queues in the job queue. Accordingly, when the number of queues in the job queue of the target peer exceeds a certain number, further connection to the target peer may be restricted.

The executing of the above described method 500 of isolating a distributor of illegal content allows a target peer distributing illegal content file to be finally isolated so that illegal contents are prevented from being circulated. In addition, as the list of target peers distributing illegal contents is received from the tracker, an illegal content user is specified and managed on the basis of a user identification value of the illegal content user.

Figure 6:
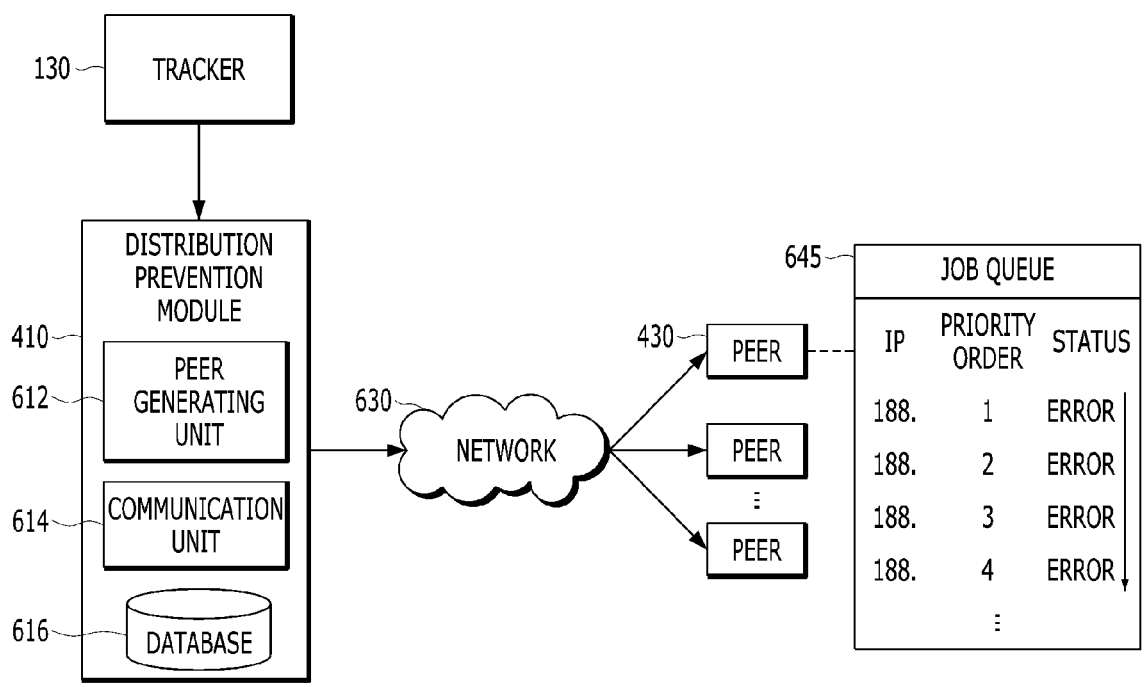
FIG. 6 is a diagram illustrating a process of transmitting a query to a target peer by a distribution prevention module that executes a method of preventing illegal content from being distributed according to an embodiment of the present disclosure.

FIG. 6 is a diagram illustrating a process of transmitting a query to a target peer by the distribution prevention module that executes a method of preventing illegal content from being distributed according to the embodiment of the present disclosure. A distribution prevention module 410 includes a peer generation unit 612, a communication unit 614, and a database 616. The distribution prevention module 410 and the peer 430 may communicate with each other through a network 630.

The peer generation unit 612 of the distribution prevention module 410 may generate a virtual peer and peer ID and may allocate a peer IP address and port value to the virtual peer and peer ID corresponding thereto so that a normal peer ID is generated. The peer ID generated as such may be used as a device for increasing the number of queues in a job queue of a torrent file of a peer (or a computer) that distributes illegal contents.

The communication unit 614 may perform communication between the distribution prevention module 410 and the tracker 130 and may also perform communication with the peer 430 through the network 630. As such, communication between the distribution prevention module 410 and external devices may be performed using, for example, a BitTorrent protocol. The communication unit 614 may receive a list including identification values of target peers that distribute illegal content from the tracker 130 and may perform a handshake for establishing a communication channel with the target peers through the list.

The database 616 may store an identification value of a torrent file of illegal content, that is, a unique hash value and file pieces of the content. On the basis of the torrent file of the illegal content stored in the database 616, the distribution prevention module 410 may receive and store a list of target peers distributing illegal contents from the tracker 130. In an embodiment, the distribution prevention module 410 is illustrated as requesting the tracker 130 to search for peers that distribute illegal content, but the present disclosure is not limited thereto. The distribution prevention module 410 may search for information about such peers in an administration webserver or a DHT.

The distribution prevention module 410 may transmit a mutation message to the peers 430 through the network 630 on the basis of the list of targeted peers. In an embodiment, the distribution prevention module 410 may transmit a mutation message to the peer 430 so that the number of queues in a job queue 645 of the peer 430 is increased. Accordingly, the distribution prevention module 410 causes a logical defect of an algorithm in a torrent client program executed by the peer 430 so that downloading or uploading illegal contents may not be further performed and the peer 430 may be isolated.

The job queue 645 in a serial manner has queues generated by queries and may manage the queues in a list. The list may indicate information about downloader peers. For example, the list may have downloader peers sequentially arranged according to the order of priority thereof and indicate peer ID information corresponding to the downloader peers. The list shown in FIG. 6 indicates IPs, priority orders, and statuses, but the present disclosure is not limited thereto, and the list may further include a port value of a peer ID, an amount uploaded or downloaded, an amount left, and an event type (event).

The apparatus or system for preventing distribution of illegal contents over the Internet according to the various embodiments described above may represent various types of devices, such as a desktop computer, a laptop computer, a wireless telephone, a cellular telephone, a wireless multimedia device, a personal digital assistant (PDA), a modem installed outside or inside a computer, a device communicating over a wireless channel, and the like. Such a device may have various names, such as an access terminal (AT), an access unit, a subscriber unit, a mobile station, a mobile device, a mobile unit, a mobile telephone, a mobile, a remote station, a remote terminal, a remote unit, a user device, user equipment, a handheld device, and the like. Any device described herein may include a memory for storing instructions and data required to execute the above described method of preventing distribution of illegal contents over the Internet, as well as hardware, software, firmware, or combinations thereof.

The techniques described in the present disclosure may be implemented in various devices. For example, the techniques may be implemented in hardware, firmware, software, or a combination thereof. Those skilled in the art should appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the specific application and design constraints imposed on the overall system. Skilled artisans may implement the described functionality in varying ways for each specific application, but such implementation decisions should not be interpreted as causing a departure from the scope of the present disclosure.

In the hardware implementation, processing units used to perform the techniques may be implemented in one or more application specific ICs (ASICs), digital signal processes (DSPs), digital signal processing devices (DSPDs), programmable logic devices (PLDs), field programmable gate arrays (FPGAs), processors, controllers, microcontrollers, microprocessors, electronic devices, other electronic units designed to perform the functions described in the present disclosure, a computer, or in a combination thereof.

Accordingly, the various illustrative logical blocks, modules, and circuits described in connection with the present disclosure may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but, alternatively, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configurations.

In the firmware and/or software implementation, the techniques may be implemented in instructions stored in a computer-readable medium, such as a random access memory (RAM), a read-only memory (ROM), a non-volatile RAM (NVRAM), a programmable read-only memory (PROM), an erasable programmable read-only memory (EPROM), an electrically erasable PROM (EEPROM), a flash memory, a compact disc (CD), a magnetic or optical data storage device, and the like. The instructions may be implementable by one or more processors, and may allow the processor (the processors) to perform specific aspects of the function described in the present disclosure.

If implemented in software, the functions may be formed as one or more instructions or code and stored on a computer-readable medium or transmitted through the computer-readable medium. Computer-readable media include both computer storage media and communication media including any medium that facilitates transfer of a computer program from one place to another. A storage media may be any available media that may be accessed by a computer. By way of non-limiting example, such a computer-readable media may include a RAM, a ROM, an EEPROM, a CD-ROM or another optical disc storage, a magnetic disk storage or another magnetic storage device, or any other medium that may be used to carry or store desired program code in the form of instructions or data structures and that may be accessed by a computer. Also, any connection is appropriately referred to as a computer-readable medium.

If the software is transmitted from a website, server, or another remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared rays, a radio, and microwaves are included in the definition of medium. Disk and disc, as used herein, include a compact disc (CD), a laser disc, an optical disc, a digital versatile disc (DVD), a floppy disk, and a blue-ray disc where disks usually reproduce data magnetically, while discs reproduce data optically with lasers. Combinations of the above should also be included within the scope of computer-readable media.

Software modules may reside in a RAM, a flash memory, a ROM, an EPROM, an EEPROM, registers, a hard disk, a removable disk, a CD-ROM, or any other form of storage medium known in the art. An illustrative storage medium may be coupled to a processor such that the processor reads information from, or writes information to, the storage medium. Alternatively, the storage medium may be integrated into the processor. The processor and the storage medium may reside in an ASIC. The ASIC may reside in a user terminal. Alternatively, the processor and the storage medium may reside as separate components in a user terminal.

The preceding description of the disclosed embodiments is provided to enable any person skilled in the art to make or use the present disclosure. Various modifications to these embodiments will be readily apparent to those skilled in the art, and the generic principles defined herein may be applied to other embodiments without departing from the scope of the invention. Thus, the present disclosure is not intended to be limiting to the embodiments shown herein but is to be accorded the widest scope consistent with the principles and novel features disclosed herein Even if the illustrative embodiments may describe the use of aspects of the current disclosed subject matter in contexts of one or more independent computer systems, the subject matter of the present disclosure is not limited thereto. Rather, the subject matter may be implemented in connection with any computing environment, such as a network or distributed computing environment. Further, the aspects of the currently disclosed subject matter may be implemented in or across a plurality of processing chips and devices, and similarly, a storage may be subjected across the plurality of devices. Such devices may include personal computers (PCs), network servers, and handheld devices.

Although the subject matter has been described in language specific to structural features and/or methodological acts, it should be understood that the subject matter defined in the appended claims is not necessarily limited to the specific features or acts described above. Rather, the specific features and acts described above are disclosed as example forms of implementing the claims.

The method described herein has been described with reference to specific embodiments but may be embodied as computer-readable codes on a computer-readable recording medium. The computer-readable recording medium is any data storage device that can store data that can be thereafter read by a computer system. Examples of the computer-readable recording medium include a ROM, a RAM, a CD-ROM, a magnetic tape, a floppy disk, an optical data storage, and the like. In addition, the computer-readable recording medium may be distributed over network-connected computer systems so that computer readable codes may be stored and executed in a distributed manner. In addition, functional programs, codes, and code segments for implementing the embodiments may be easily construed by programmers skilled in the art to which the present disclosure pertains.

As is apparent from the above, the various embodiments of the present disclosure can isolate a user computer that distributes illegal content through a program for distributing or sharing a file using a P2P communication method, such as Torrent. Accordingly, user computers (e.g., an illegal uploader and an illegal downloader), when joining Torrent, distributing or downloading illegal content are detected and isolated so that distribution of illegal contents can be prevented. For example, at a time of distributing or downloading pirated articles, such as pre-release movies, new music, dramas, pornography, and the like through Torrent, a user computer executing the distribution is recognized and isolated so that circulation of pirated articles can be prevented. In addition, an identification value of a user who executes such distribution of pirated articles is extracted so that the illegal user can be targeted and managed.

Although the exemplary embodiments of the present disclosure have been described for illustrative purposes, those skilled in the art will appreciate that various modifications, additions and substitutions are possible without departing from the scope and spirit of the disclosure. In addition, all modifications and equivalents come within the scope of the appended claims.

What is claimed is:

1. A method of preventing illegal content from being distributed over the Internet, the method comprising:
    searching for, by a distribution prevention module, a hash value of specific content;
    extracting, by the distribution prevention module, a target peer that distributes the specific content on the basis of the hash value to generate an identification value of the target peer;
    establishing, by the distribution prevention module, an initial connection with the target peer; and
    transmitting, by the distribution prevention module, a query to the target peer, such that a number of queues in a job queue of the target peer is increased,
    wherein the establishing, by the distribution prevention module, of the initial connection with the target peer includes:
    generating a virtual peer and an identification value of the virtual peer; and
    generating a message for the initial connection with the target peer using the identification value of the virtual peer.

2. The method of claim 1, wherein the searching for, by the distribution prevention module, the hash value of the specific content includes:
    transmitting, by the distribution prevention module, the hash value of the specific content to a tracker;
    receiving a list of user identification values of the specific content from the tracker; and
    storing the received list of user identification values in a database.

3. The method of claim 2, wherein the extracting, by the distribution prevention module, of the target peer that distributes the specific content on the basis of the hash value to generate the identification value of the target peer includes extracting the target peer that downloads or uploads the specific content from the list of user identification values stored in the database.

4. The method of claim 1, wherein the hash value of the specific content includes a hash key concatenated string with respect to file pieces of the specific content.

5. The method of claim 1, wherein the transmitting, by the distribution prevention module, of the query to the target peer includes:
    generating a peer identification(ID) from the identification value of the virtual peer; and
    transmitting the query to the target peer using the peer ID such that the target peer is prevented from distributing the specific content.

6. The method of claim 5, wherein the preventing of the target peer from distributing the specific content includes:
    repeatedly transmitting the query to the job queue of the target peer using the peer ID; and preventing the specific content from being uploaded or downloaded when the number of jobs waiting in queues of the job queue exceeds a critical value.

7. The method of claim 6, wherein the preventing of the target peer from distributing the specific content using the peer ID further includes repeating, by the distribution prevention module, the establishing of the initial connection with the target peer and the transmitting of the query to the target peer when the upload or download of the specific content is not prevented.

8. A non-transitory computer readable storage medium that records a program including an instruction for executing:
   searching for, by a distribution prevention module, a hash value of specific content;
   extracting, by the distribution prevention module, a target peer that distributes the specific content on the basis of the hash value to generate an identification value of the target peer;
   establishing, by the distribution prevention module, an initial connection with the target peer; and
   transmitting, by the distribution prevention module, a query to the target peer,
   wherein the establishing, by the distribution prevention module, of the initial connection with the target peer includes:
   generating a virtual peer and an identification value of the virtual peer; and
   generating a message for the initial connection with the target peer using the identification value of the virtual peer.

9. The non-transitory computer-readable storage medium of claim 8, wherein the searching for, by the distribution prevention module, the hash value of the specific content includes:
   transmitting, by the distribution prevention module, the hash value of the specific content to a tracker;
   receiving a list of user identification values of the specific content from the tracker; and
   storing the received list of user identification values in a database.

10. The non-transitory computer-readable storage medium of claim 9, wherein the extracting, by the distribution prevention module, of the target peer that distributes the specific content on the basis of the hash value to generate the identification value of the target peer includes extracting the target peer that downloads or uploads the specific content from the list of user identification values stored in the database.

11. The non-transitory computer-readable storage medium of claim 8, wherein the hash value of the specific content includes a hash key concatenated string with respect to file pieces of the specific content.

12. The non-transitory computer-readable storage medium of claim 8, wherein the transmitting, by the distribution prevention module, of the query to the target peer includes:
   generating a peer identification (ID) from the identification value of the virtual peer; and
   transmitting the query to the target peer using the peer ID such that the target peer is prevented from distributing the specific content.

13. The non-transitory computer-readable storage medium of claim 12, wherein the preventing of the target peer from distributing the specific content includes:
   repeatedly transmitting the query to a job queue of the target peer using the peer ID; and
   preventing the specific content from being uploaded or downloaded when the number of jobs waiting in queues of the job queue exceeds a critical value.

14. The non-transitory computer-readable storage medium of claim 13, wherein the preventing of the target peer from distributing the specific content using the peer ID further includes repeating, by the distribution prevention module, the establishing of the initial connection with the target peer and the transmitting of the query to the target peer when the upload or download of the specific content is not prevented.

15. A system for preventing illegal content from being distributed over the Internet, the system comprising:
   a tracker configured to store and manage a hash value of specific content and information about target peers that download or upload the specific content; and
   a distribution prevention module configured to search for the hash value of the specific content in the tracker and prevent the specific content from being distributed by the target peers on the basis of the hash value of the specific content,
   wherein the distribution prevention module extracts a target peer that distributes the specific content on the basis of the hash value of the specific content to generate an identification value of the target peer, generates a virtual peer and an identification value of the virtual peer, generates a message for the initial connection with the target peer using the identification value of the virtual peer, establishes an initial connection with the target peer using the identification value of the target peer, and transmits a query to the target peer to increase the number of queues of a job queue of the target peer so that distribution of the specific content is prevented.

* * * * *